United States Patent
Saito et al.

(10) Patent No.: US 7,328,684 B2
(45) Date of Patent: Feb. 12, 2008

(54) CONTROL DEVICE FOR INTERNAL COMBUSTION ENGINE

(75) Inventors: Haruhiko Saito, Toyota (JP); Tomihisa Tsuchiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/361,994

(22) Filed: Feb. 27, 2006

(65) Prior Publication Data

US 2006/0207550 A1 Sep. 21, 2006

(30) Foreign Application Priority Data

Mar. 18, 2005 (JP) ............... 2005-078296

(51) Int. Cl.
*F02B 5/02* (2006.01)
*F02B 7/04* (2006.01)
*F02M 59/36* (2006.01)
*F02M 61/16* (2006.01)

(52) U.S. Cl. ............ 123/299; 123/431; 123/458; 123/305; 239/533.12

(58) Field of Classification Search ............... 123/295, 123/299, 300, 302, 304, 305, 308, 316, 432, 123/457, 458, 478, 480, 392; 701/103–105; 239/533.11, 533.12
See application file for complete search history.

(56) References Cited

U.S. PATENT DOCUMENTS

| | | | |
|---|---|---|---|
| 5,085,193 A * | 2/1992 | Morikawa ............ 123/458 |
| 5,207,058 A * | 5/1993 | Sasaki et al. ............ 60/284 |
| 5,291,865 A | 3/1994 | Sasaki |
| 5,313,924 A * | 5/1994 | Regueiro ............ 123/458 |
| 6,173,690 B1 * | 1/2001 | Iriya et al. ............ 123/295 |
| 6,959,693 B2 * | 11/2005 | Oda ............ 123/431 |
| 7,104,255 B2 * | 9/2006 | Hashima et al. ............ 123/431 |
| 2006/0207547 A1 * | 9/2006 | Saito ............ 123/431 |

FOREIGN PATENT DOCUMENTS

| DE | 692 08 782 T2 | 9/1996 |
|---|---|---|
| EP | 1 484 498 A1 | 12/2004 |
| JP | A 2000-220460 | 8/2000 |
| JP | A 2003-254199 | 9/2003 |

OTHER PUBLICATIONS

"Kraftfahrtechnisches Taschenbuch," *BOSCH* (Horst Bauer—Editor), 23rd Edition, Braunschweig, Wiesbaden: Vieweg, pp. 498-509 (1999).

* cited by examiner

*Primary Examiner*—Willis R. Wolfe, Jr.
(74) *Attorney, Agent, or Firm*—Oliff & Berridge, PLC

(57) ABSTRACT

An engine ECU executes a program including the steps of: detecting an accelerator position; calculating a load factor KL of an engine based on the accelerator position or the like; when the engine is in a high load region, raising a pressure of fuel supplied to an in-cylinder injector and increasing a degree of opening of a throttle valve and/or increasing a lift amount of an intake valve; and when the engine is not in the high load region, lowering the pressure of the fuel supplied to the in-cylinder injector and decreasing the degree of opening of the throttle valve and/or decreasing the lift amount of the intake valve.

16 Claims, 12 Drawing Sheets

500A   500B

CONTROL DEVICE FOR INTERNAL COMBUSTION ENGINE

This nonprovisional application is based on Japanese Patent Application No. 2005-078296 filed with the Japan Patent Office on Mar. 18, 2005, the entire contents of which are hereby incorporated by reference.

BACKGROUND OF THE INVENTION

1. Field of the Invention

The present invention relates to an internal combustion engine for a vehicle, and more particularly to an internal combustion engine that includes at least a first fuel injection mechanism (in-cylinder injector) for injecting a fuel into a cylinder and further includes a second fuel injection mechanism (intake manifold injector) for injecting a fuel into an intake manifold or an intake port.

2. Description of the Background Art

An internal combustion engine provided with an intake manifold injector for injecting a fuel into an intake manifold and an in-cylinder injector for injecting a fuel into a combustion chamber, in which fuel injection from the intake manifold injector is stopped when load of the engine is lower than preset load and fuel injection from the intake manifold injector is allowed when load of the engine is higher than the preset load, is known.

An in-cylinder injection type engine aiming at improvement in combustion efficiency and purification of exhaust gas by making smaller particles of fuel injected into the cylinder represents one example of techniques related to such an in-cylinder injector in an internal combustion engine. For example, Japanese Patent Laying-Open No. 2003-254199 discloses an in-cylinder fuel injection type internal combustion engine that achieves ensured improvement in fuel efficiency by permitting setting of a high compression ratio even when an average air-fuel ratio of the whole air-fuel mixture in a cylinder bore is high and when the air-fuel mixture is lean on the average such as in a low load state of the internal combustion engine. In the in-cylinder fuel injection type internal combustion engine, an intake manifold is formed on one side of a cylinder head, whereas an exhaust manifold is formed on the other side thereof when the cylinder in which an axial center of the cylinder bore is aligned with a vertical line is viewed from a side. The in-cylinder fuel injection type internal combustion engine includes a fuel injection valve capable of injecting the fuel in an obliquely downward direction from an end side on one side of the cylinder head into the cylinder bore and a spark plug of which discharge portion is exposed within the cylinder bore substantially on the axial center of the cylinder bore. In the in-cylinder fuel injection type internal combustion engine, when the cylinder is viewed two-dimensionally, the fuel injected from the fuel injection valve is in an inverted V-shape with the discharge portion lying between two prongs, and the fuel is injected from the fuel injection valve in an intake stroke.

According to the in-cylinder fuel injection type internal combustion engine, the fuel injected from the fuel injection valve is in an inverted V-shape with the discharge portion lying between the two prongs. In addition, in the intake stroke of the internal combustion engine, the piston is lowered from the top dead center. This direction of lowering is the same as the direction of injection of the fuel from the fuel injection valve. Therefore, the fuel injected from the fuel injection valve travels along each outer side of the discharge portion. Here, furious collision of the fuel with an upper surface of the piston is prevented, and the fuel smoothly travels in a direction of injection. When forward ends of respective two-pronged injected fuel on the left and right reach an inner circumferential surface of the cylinder bore and the upper surface of the piston, the fuels are guided by these surfaces so that some part of the fuels comes closer to each other in a circumferential direction of the cylinder bore, while other part thereof moves away from each other in the circumferential direction of the cylinder bore. Then, in the intake stroke and the following compression stroke, most of the fuel injected into the cylinder bore is concentrated in an area in the vicinity of the inner circumferential surface of the cylinder bore substantially uniformly in the circumferential direction. Namely, when the cylinder is viewed two-dimensionally, a stratified, ring-shaped rich air-fuel mixture substantially around the axial center of the cylinder bore and a stratified, lean air-fuel mixture surrounded by the stratified rich air-fuel mixture and located in the vicinity of the discharge portion are formed in the cylinder bore.

In the in-cylinder fuel injection type internal combustion engine described above, a desired fuel spray form is maintained by supplying the fuel at a high pressure from the in-cylinder injector to maintain traveling force of the fuel with that pressure. Depending on a load state of the internal combustion engine, however, there is a fuel spray form more preferable than the fuel spray form above. Japanese Patent Laying-Open No. 2003-254199 does not disclose such a point of view.

SUMMARY OF THE INVENTION

An object of the present invention is to provide a control device for an internal combustion engine capable of achieving a more preferable fuel spray form in a cylinder of the internal combustion engine, at least in the internal combustion engine in which a fuel is directly injected into the cylinder.

A control device for an internal combustion engine according to the present invention controls the internal combustion engine provided with a fuel injection mechanism for injecting a fuel into a cylinder. The internal combustion engine includes an intake manifold formed on one side of a cylinder head when a cylinder, in which an axial center of a cylinder bore is aligned with a vertical line, is viewed from a side, an exhaust manifold formed on a side opposite to the intake manifold, a piston making up-down movement through the cylinder bore, and a spark plug of which discharge portion is exposed within the cylinder bore. The fuel injected from the fuel injection mechanism forms a spray in an inverted V-shape with the discharge portion lying between two prongs of the spray when the cylinder is viewed two dimensionally. The control device includes: a detection unit for detecting a load state of the internal combustion engine; a fuel pressure control unit for varying a pressure of the fuel supplied to the fuel injection mechanism; and an air amount control unit for varying an amount of air suctioned into the cylinder based on the load state.

According to the present invention, in the high load state (a state in which large output is requested), an amount of air suctioned into the cylinder is increased and an amount of the fuel injected into the cylinder by the fuel injection mechanism is also increased. Here, the pressure within the cylinder is not set to a large negative pressure (it is lower than atmospheric pressure, however, its absolute value is small). The pressure of the fuel supplied to the fuel injection mechanism is raised, so that traveling force of the fuel injected from the fuel injection mechanism can be large as a result of the high fuel pressure. As such, in the high load region, the traveling force is great as a result of the high fuel pressure and the negative pressure is small. Therefore, two prongs of the spray in the inverted V-shape with the discharge portion lying therebetween do not intersect with each other. Then, the fuel injected from the fuel injection mechanism attains a desired state and the fuel is diffused in the cylinder. Accordingly, homogeneity of the fuel in the cylinder is enhanced and satisfactory homogenous combustion can be realized. On the other hand, in the low load region (a state in which large output is not requested), an amount of air suctioned into the cylinder is decreased and an amount of fuel injected into the cylinder by the fuel injection mechanism is also decreased. Here, the pressure within the cylinder is set to a large negative pressure (it is lower than atmospheric pressure and its absolute value is large). The pressure of the fuel supplied to the fuel injection mechanism is lowered, so that traveling force of the fuel injected from the fuel injection mechanism is lowered as a result of the low fuel pressure. As such, in the low load region, the traveling force is small as a result of the low fuel pressure and the negative pressure is large. Therefore, a thickness of the spray in the inverted V-shape with the discharge portion lying between the two spray prongs is made larger by the negative pressure in the cylinder, so that the two spray prongs are caused to overlap in the vicinity of the spark plug (the two spray prongs intersect with each other). In this manner, a rich state can be attained in the vicinity of the spark plug, while an area around the same can attain a lean state. Accordingly, a stratified state of the fuel in the cylinder is enhanced and satisfactory stratified (semi-stratified) charge combustion can be realized. In addition, ignitionability is improved and fuel efficiency can be improved. As described above, the pressure of the fuel supplied to the fuel injection mechanism or an amount of air suctioned into the cylinder is varied based on the load state, to thereby vary the state of fuel in the cylinder. Consequently, a control device for an internal combustion engine, capable of achieving a more preferable fuel spray form in a cylinder of the internal combustion engine, at least in the internal combustion engine in which fuel is directly injected into the cylinder, can be provided.

Preferably, when load is high, the fuel pressure control unit controls the pressure of the fuel such that it is raised and the air amount control unit controls the amount of the air such that it is increased.

According to the present invention, in the high load state, an amount of air suctioned into the cylinder is increased and a pressure of the fuel supplied to the fuel injection mechanism is increased, so that traveling force of the fuel injected from the fuel injection mechanism can be large as a result of the high fuel pressure. As such, in the high load region, the traveling force is great as a result of the high fuel pressure and the negative pressure is small. Therefore, two prongs of the spray in the inverted V-shape with the discharge portion lying therebetween do not intersect with each other. Then, the fuel injected from the fuel injection mechanism attains a desired state and the fuel is diffused in the cylinder. Accordingly, homogeneity of the fuel in the cylinder is enhanced and satisfactory homogenous combustion can be realized.

Preferably, when the load is low, the fuel pressure control unit controls the pressure of the fuel such that it is lowered and the air amount control unit controls the amount of the air such that it is decreased.

According to the present invention, in the low load region, an amount of air suctioned into the cylinder is decreased and the pressure of the fuel supplied to the fuel injection mechanism is lowered, so that traveling force of the fuel injected from the fuel injection mechanism can be lowered as a result of the low fuel pressure. As such, in the low load region, the traveling force is small as a result of the low fuel pressure and the negative pressure is large. Therefore, a thickness of the spray in the inverted V-shape with the discharge portion lying between the two spray prongs is made larger by the negative pressure in the cylinder, so that the two spray prongs are caused to overlap in the vicinity of the spark plug (the two spray prongs intersect with each other). In this manner, a rich state can be attained in the vicinity of the spark plug, while an area around the same can attain a lean state. Accordingly, a stratified state of the fuel in the cylinder is enhanced and satisfactory stratified (semi-stratified) charge combustion can be realized. In addition, ignitionability is improved and fuel efficiency can be improved.

Preferably, the air amount control unit varies the amount of the air by adjusting a position of a throttle valve provided in the intake manifold.

According to the present invention, a degree of opening of the throttle valve is increased so as to increase an amount of air suctioned into the cylinder, or alternatively, a degree of opening of the throttle valve is decreased so as to reduce an amount of air suctioned into the cylinder.

Preferably, the air amount control unit controls a variable lift amount control mechanism provided in the internal combustion engine for varying an amount of lift of an intake valve, so as to adjust the lift amount, thereby varying the amount of the air.

According to the present invention, the variable lift amount control mechanism provided in the internal combustion engine can increase the amount of lift of the intake valve so as to increase the amount of air suctioned into the cylinder, or alternatively, it can decrease the amount of lift of the intake valve so as to reduce an amount of air suctioned into the cylinder.

Preferably, when the cylinder is viewed two-dimensionally, an angle of spread between the two prongs of the spray in the inverted V-shape is set to approximately 40° to approximately 50°.

According to the present invention, as the angle of spread between the two prongs of the spray in the inverted V-shape is set to approximately 40° to approximately 50° when the cylinder is viewed two-dimensionally, a fuel spray state in the cylinder can be homogenous at a desired high fuel pressure (and when the negative pressure in the cylinder is not large), without the two spray prongs intersecting with each other. Alternatively, the two spray prongs are pulled and spread by the negative pressure and intersect with each other at a desired low fuel pressure (and when the negative pressure in the cylinder is large). Here, the spark plug is arranged at such intersection. Therefore, a rich state of the fuel can be attained in the vicinity of the spark plug, while a lean state can be attained in the area around the same.

Preferably, when the cylinder is viewed two-dimensionally, one of the two prongs of the spray in the inverted V-shape has a thickness of approximately 5° to approximately 12° at a position distant from an injection hole of the fuel injection mechanism by approximately 30 mm.

According to the present invention, as one of the two prongs of the spray in the inverted V-shape has a thickness of approximately 5° to approximately 12° at the position distant from the injection hole of the fuel injection mechanism by approximately 30 mm when the cylinder is viewed two-dimensionally, a fuel spray state in the cylinder can be homogenous at a desired high fuel pressure (and when the negative pressure in the cylinder is not large), without the two spray prongs intersecting with each other. Alternatively, the two spray prongs are pulled and spread by the negative pressure and intersect with each other at a desired low fuel pressure (and when the negative pressure in the cylinder is large). Here, the spark plug is arranged at such intersection. Therefore, a rich state of the fuel can be attained in the vicinity of the spark plug, while a lean state can be attained in the area around the same.

Preferably, when the cylinder is viewed from the side, one of the two prongs of the spray in the inverted V-shape has a thickness of approximately 29.5° to approximately 37.5° at a position distant from an injection hole of the fuel injection mechanism by approximately 40 mm.

According to the present invention, as one of the two prongs of the spray in the inverted V-shape has a thickness of approximately 29.5° to approximately 37.5° at the position distant from the injection hole of the fuel injection mechanism by approximately 40 mm when the cylinder is viewed from the side, a fuel spray state in the cylinder can be homogenous at a desired high fuel pressure (and when the negative pressure in the cylinder is not large), without the two spray prongs intersecting with each other. Alternatively, the two spray prongs are pulled and spread by the negative pressure and intersect with each other at a desired low fuel pressure (and when the negative pressure in the cylinder is large). Here, the spark plug is arranged at such intersection. Therefore, a rich state of the fuel can be attained in the vicinity of the spark plug, while a lean state can be attained in the area around the same.

Preferably, the internal combustion engine further includes a fuel injection mechanism injecting a fuel into an intake manifold.

According to the present invention, in addition to the in-cylinder injector, the fuel can be injected from the intake manifold injector into the intake manifold so as to improve homogeneity of the air-fuel mixture during homogenous combustion.

Preferably, the fuel injection mechanism injecting the fuel into the cylinder is an in-cylinder injector, and the fuel injection mechanism injecting the fuel into the intake manifold is an intake manifold injector.

According to the present invention, in the internal combustion engine in which the in-cylinder injector serving as the fuel injection mechanism injecting the fuel into the cylinder and the intake manifold injector injecting the fuel into the intake manifold are separately provided to inject the fuel, a rich air-fuel mixture can be formed around the spark plug.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
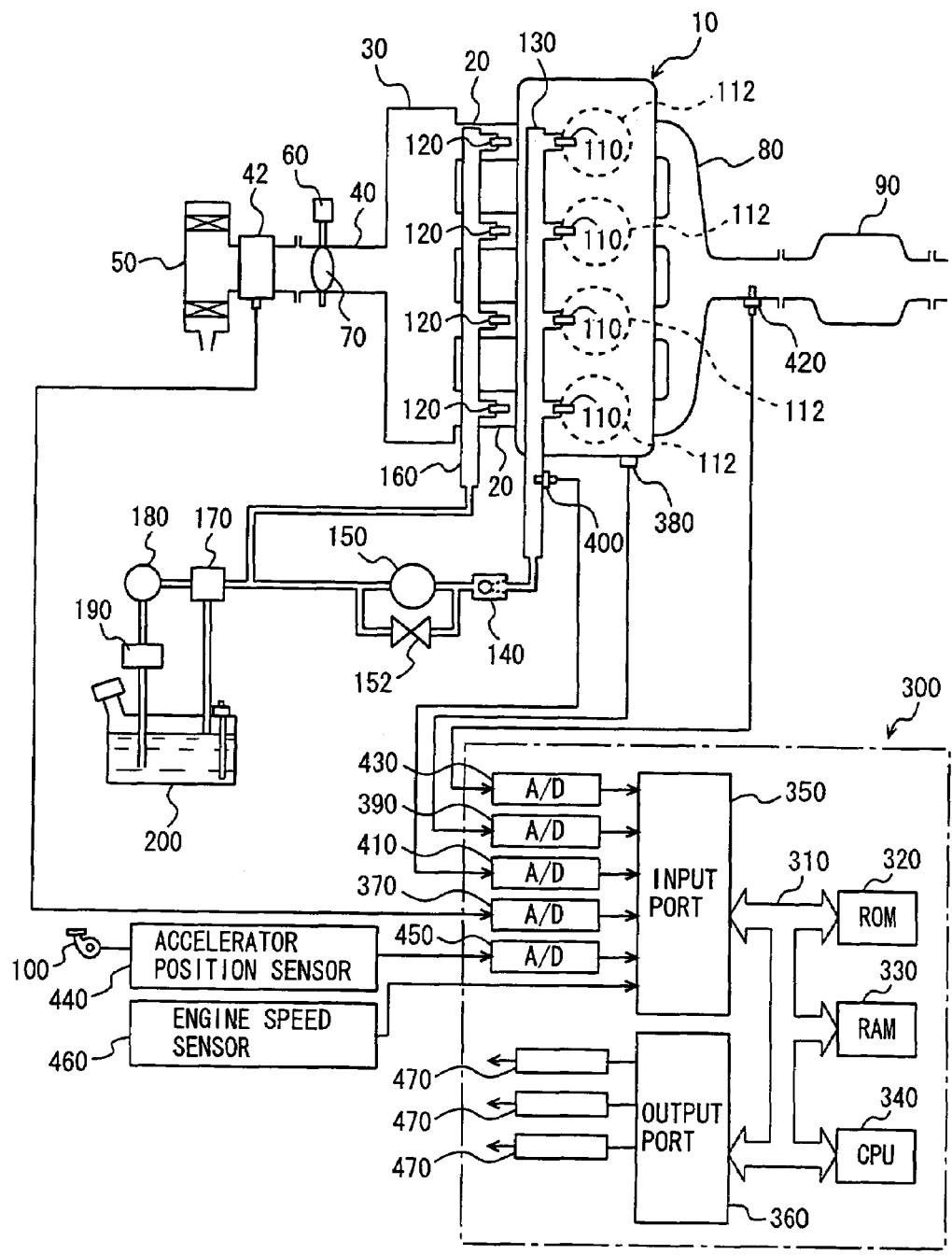
FIG. 1 is a schematic configuration diagram of an engine system controlled by a control device according to an embodiment of the present invention.

An embodiment of the present invention will be described hereinafter with reference to the drawings. The same elements have the same reference characters allotted. Their label and function are also identical. Therefore, detailed description thereof will not be repeated.

FIG. 1 schematically shows a configuration of an engine system controlled by an engine ECU (Electronic Control Unit) that is a control device of an internal combustion engine according to an embodiment of the present invention. Although an in-line 4-cylinder gasoline engine is shown in FIG. 1, application of the present invention is not restricted to the engine shown, and the engine may be a V-type 6-cylinder engine, a V-type 8-cylinder engine and an in-line 6-cylinder engine. In addition, though an engine having an in-cylinder injector and an intake manifold injector will be described hereinafter, the present invention is applicable to any engine having at least an in-cylinder injector.

In addition, the engine system will be described hereinafter as having a valve lift amount varying mechanism (a mechanism that can continuously or discontinuously vary a lift amount of an intake valve or an exhaust valve), however, the present invention is applicable also to an engine system not having such a valve lift amount varying mechanism.

As shown in FIG. 1, an engine 10 includes four cylinders 112, which are connected via corresponding intake manifolds 20 to a common surge tank 30. Surge tank 30 is connected via an intake duct 40 to an air cleaner 50. In intake duct 40, an airflow meter 42 and a throttle valve 70, which is driven by an electric motor 60, are disposed. Throttle valve 70 has its opening position controlled based on an output signal of an engine ECU (Electronic Control Unit) 300, independently of an accelerator pedal 100. Cylinders 112 are connected to a common exhaust manifold 80, which is in turn connected to a three-way catalytic converter 90.

For each cylinder 112, an in-cylinder injector 110 for injecting fuel into the cylinder and an intake manifold injector 120 for injecting fuel into an intake port and/or an intake manifold are provided. These injectors 110, 120 are controlled based on output signals of engine ECU 300. In-cylinder injectors 110 are connected to a common fuel delivery pipe 130. Fuel delivery pipe 130 is connected to a high-pressure fuel pump 150 of an engine driven type via a check valve 140 that allows flow toward fuel delivery pipe 130. In the present embodiment, description will be made as to the internal combustion engine having two injectors provided separately, although the present invention is not limited thereto. For example, the internal combustion engine may have a single injector capable of performing both in-cylinder injection and intake manifold injection.

As shown in FIG. 1, the discharge side of high-pressure fuel pump 150 is connected to the intake side of high-pressure fuel pump 150 via an electromagnetic spill valve 152. It is configured such that the quantity of the fuel supplied from high-pressure fuel pump 150 to fuel delivery pipe 130 increases as the degree of opening of electromagnetic spill valve 152 is smaller, and that fuel supply from high-pressure fuel pump 150 to fuel delivery pipe 130 is stopped when electromagnetic spill valve 152 is fully opened. Electromagnetic spill valve 152 is controlled based on an output signal of engine ECU 300.

Meanwhile, intake manifold injectors 120 are connected to a common fuel delivery pipe 160 on the low-pressure side. Fuel delivery pipe 160 and high-pressure fuel pump 150 are connected to a low-pressure fuel pump 180 of an electric motor driven type via a common fuel pressure regulator 170. Further, low-pressure fuel pump 180 is connected to a fuel tank 200 via a fuel filter 190. Fuel pressure regulator 170 is configured to return a part of the fuel discharged from low-pressure fuel pump 180 to fuel tank 200 when the pressure of the fuel discharged from low-pressure fuel pump 180 becomes higher than a preset fuel pressure. This prevents the pressure of the fuel supplied to intake manifold injectors 120 as well as the pressure of the fuel supplied to high-pressure fuel pump 150 from becoming higher than the preset fuel pressure.

Engine ECU 300 is configured with a digital computer, which includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air quantity, and the output voltage of airflow meter 42 is input via an A/D converter 370 to input port 350. A coolant temperature sensor 380 is attached to engine 10, which generates an output voltage proportional to an engine coolant temperature. The output voltage of coolant temperature sensor 380 is input via an A/D converter 390 to input port 350.

A fuel pressure sensor 400 is attached to fuel delivery pipe 130, which generates an output voltage proportional to a fuel pressure in fuel delivery pipe 130. The output voltage of fuel pressure sensor 400 is input via an A/D converter 410 to input port 350. An air-fuel ratio sensor 420 is attached to exhaust manifold 80 located upstream of three-way catalytic converter 90. Air-fuel ratio sensor 420 generates an output voltage-proportional to an oxygen concentration in the exhaust gas, and the output voltage of air-fuel ratio sensor 420 is input via an A/D converter 430 to input port 350.

Air-fuel ratio sensor 420 in the engine system of the present embodiment is a full-range air-fuel ratio sensor (linear air-fuel ratio sensor) that generates an output voltage proportional to an air-fuel ratio of the air-fuel mixture burned in engine 10. As air-fuel ratio sensor 420, an $O_2$ sensor may be used which detects, in an on/off manner, whether the air-fuel ratio of the mixture burned in engine 10 is rich or lean with respect to a theoretical air-fuel ratio.

Accelerator pedal 100 is connected to an accelerator position sensor 440 that generates an output voltage proportional to a degree of press-down of accelerator pedal 100. The output voltage of accelerator position sensor 440 is input via an A/D converter 450 to input port 350. An engine speed sensor 460 generating an output pulse representing the engine speed is connected to input port 350. ROM 320 of engine ECU 300 prestores, in the form of a map, values of fuel injection quantity that are set corresponding to operation states based on the engine load factor and the engine speed obtained by the above-described accelerator position sensor 440 and engine speed sensor 460, respectively, and the correction values based on the engine coolant temperature.

Figure 2:
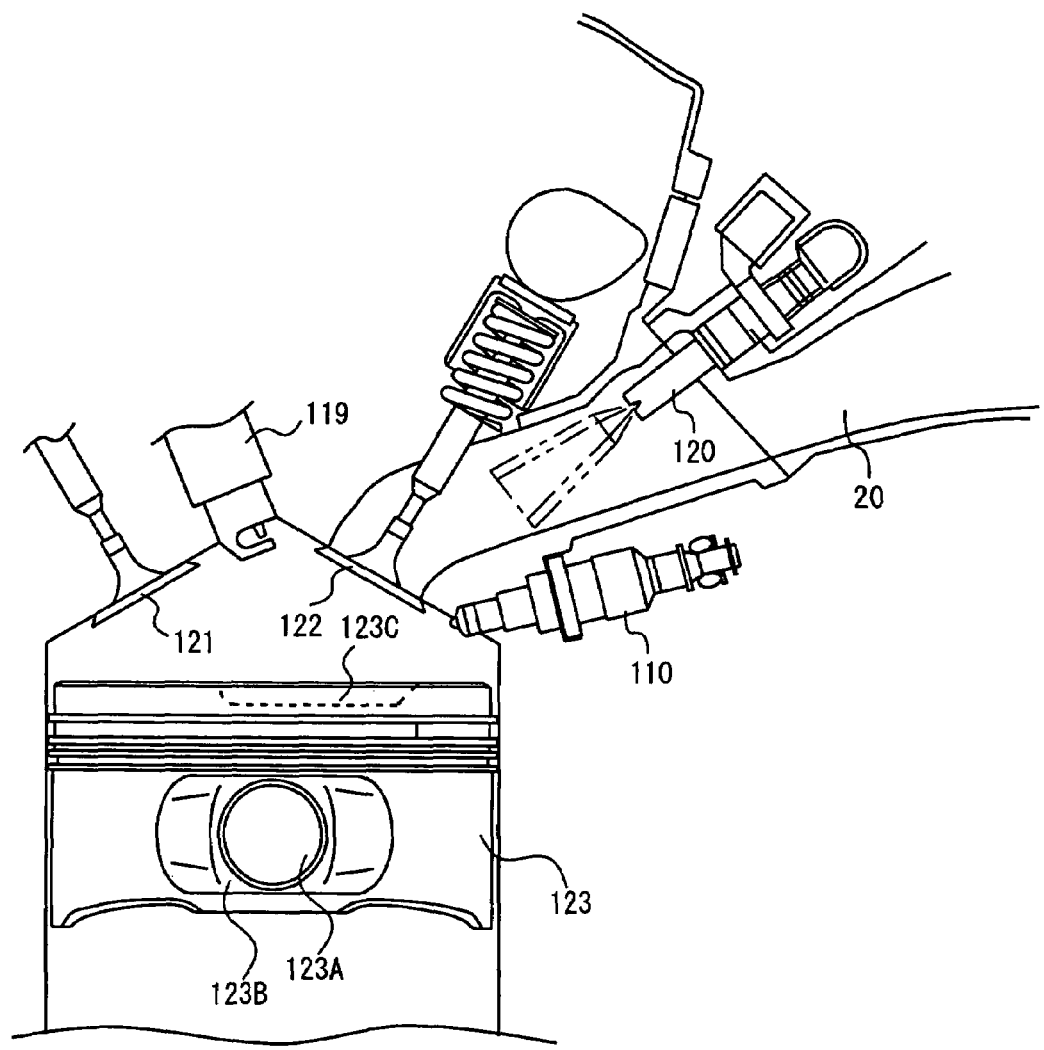
FIG. 2 is a partially enlarged view of FIG. 1.

FIG. 2 is a partially enlarged view of FIG. 1. FIG. 2 illustrates positional relation of in-cylinder injector 110 and intake manifold injector 120 in each cylinder 112 shown in FIG. 1 as well as positional relation of intake manifold 20, an intake valve 122, an exhaust valve 121, a spark plug 119, and a piston 123.

Intake valve 122 is provided on the combustion chamber side of intake manifold 20, and intake manifold injector 120 is arranged upstream of intake valve 122. Intake manifold injector 120 injects the fuel toward an inner wall of intake manifold 20 that serves as an intake air passage.

An example of a direction of fuel injection from intake manifold injector 120 may be as follows.

PM (Particulate Matter) within the combustion chamber flows back to intake manifold 20 due to overlap between intake valve 122 and exhaust valve 121, and the fuel injected from intake manifold injector 120 is sprayed. Then, particulate fuel serves as an adhesive and may remain as deposits on the inner wall of intake manifold 20 on a side close to intake valve 122. The direction of fuel injection from intake manifold injector 120 is set to a direction toward the deposits, so that the deposits can be washed away by the fuel injected from the intake manifold injector 120.

In intake manifold 20, a component for forming a vortex flow in the combustion chamber such as a swirl control valve is not provided. If such a swirl control valve is provided, the flow coefficient is lowered and air in an amount necessary and sufficient at the time of WOT cannot flow into the combustion chamber. In the internal combustion engine according to the present embodiment, however, a higher flow coefficient is set so as to implement a high flow rate port. It is noted that a tangential type intake port may be provided, so long as a high flow rate can be achieved. The tangential type port does not have such a spiraling shape around intake valve 122 as swinging to the left and right but extends straight and has an arcing end portion swinging up and down along a large arc. Therefore, resistance to flow within the intake port is small, and the flow coefficient of the intake port is much greater than that of the swirl port. Namely, volumetric efficiency is higher, and a large amount of air can be suctioned into the combustion chamber. Preferably, a flow coefficient Cf of the intake port is set to a value of 0.5 to 0.7 or higher.

As shown in FIG. 2, a cavity 123C which is a recess having a gently curved contour is provided in the top portion of piston 123, in a position opposing in-cylinder injector 10. The fuel is injected from in-cylinder injector 110 toward cavity 123C. As the top portion of piston 123 opposing in-cylinder injector 110 does not have a corner portion, the spray formed by the fuel injected from in-cylinder injector 110 is not divided by the corner portion. If the sprayed fuel is divided, a local rich state that adversely affects combustion (local rich herein refers to formation of a rich air-fuel mixture in an area other than the area in the vicinity of spark plug 119) may be caused. Such a state, however, can be avoided. It is noted that detailed description of the shape of the fuel sprayed from in-cylinder injector 110 will be given later. In addition, detailed description as to how the spray formed by the fuel injected from in-cylinder injector 110 is transformed as a result of cavity 123C will also be given later. Moreover, a ratio of fuel injection between in-cylinder injector 110 and intake manifold injector 120 arranged as shown in FIG. 2 will be described in detail later.

Figure 3A:
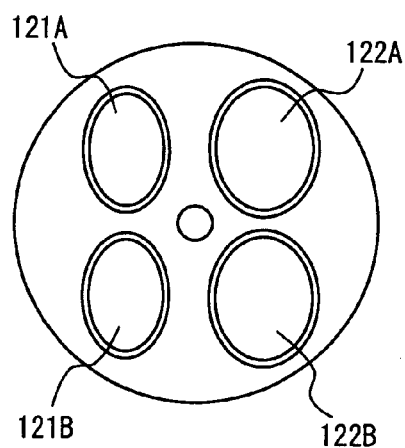
FIGS. 3A to 4 illustrate arrangement of an intake valve and an exhaust valve.
Figure 3B:
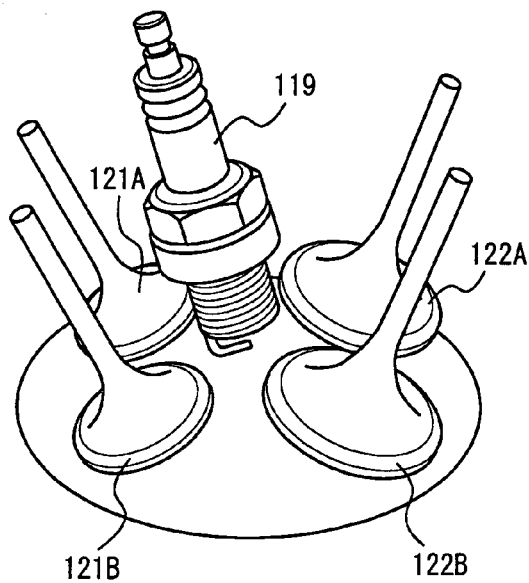

Referring to FIGS. 3A and 3B, intake valve 122 and exhaust valve 121 will be described. As shown in FIGS. 3A and 3B, engine 10 includes two intake valves 122 (a first intake valve 122A and a second intake valve 122B) and two exhaust valves 121 (a first exhaust valve 121A and a second exhaust valve 121B). It is noted that the number of the exhaust valves is not limited to two in the present invention. For example, a single exhaust valve may be provided.

Spark plug 119 is provided around the center of an area surrounded by four valves. In-cylinder injector 110 is provided between intake valve 122A and intake valve 122B.

Figure 4:
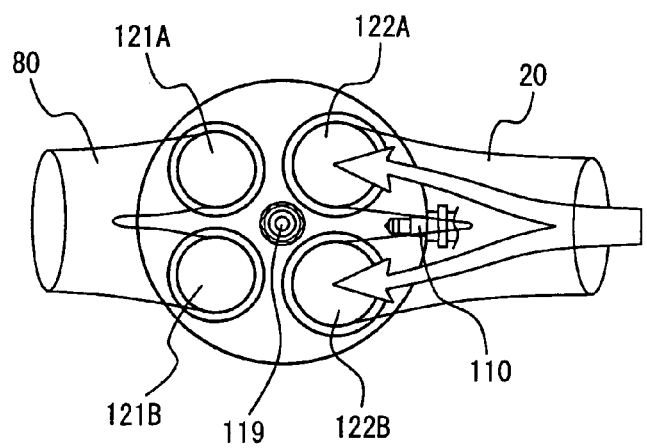

FIG. 4 is a cross-sectional view of engine 10 viewed from above. Intake manifold 20 is divided into two branches upstream of a point of connection with the cylinder head, the number of branches corresponding to the number of intake valves 122. Intake air that flows through intake manifold 20 is introduced into the cylinder through intake valve 122A and intake valve 122B.

The exhaust resulting from combustion in the combustion chamber is sent to exhaust manifold 80 through exhaust valve 121A and exhaust valve 121B. In this case as well, exhaust manifolds 80 are merged into one immediately downstream of the point of connection with the cylinder head. In addition, exhaust manifolds 80 in four respective cylinders are merged into one.

As shown in FIG. 4, in-cylinder injector 110 is provided between intake valve 122A and intake valve 122B.

Figure 5:
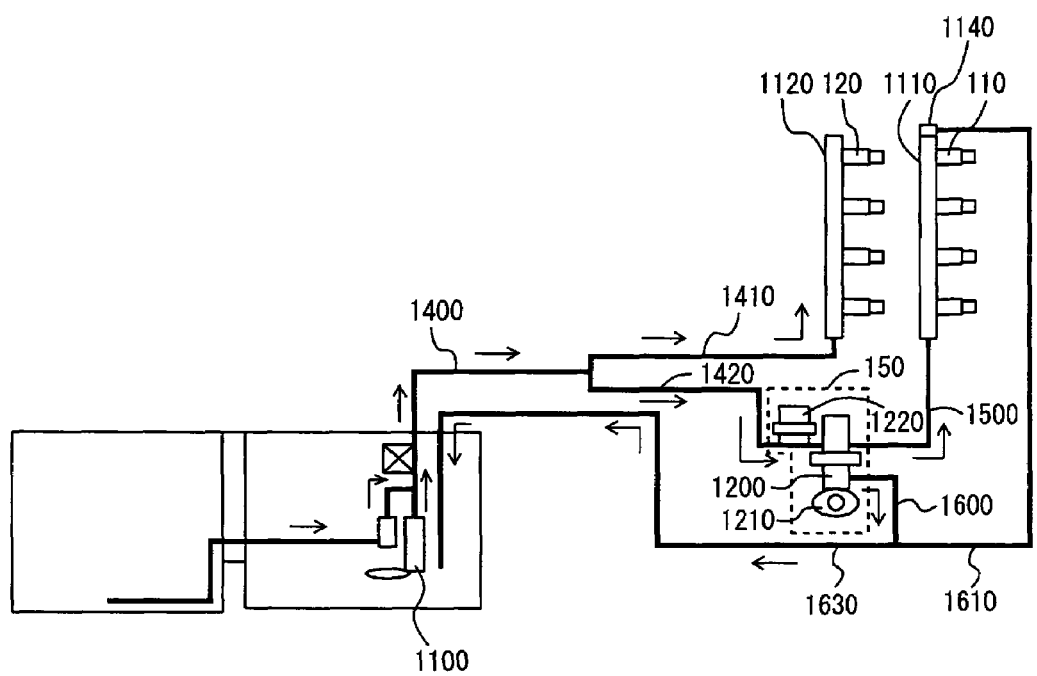
FIG. 5 is a schematic diagram showing an overall fuel supply mechanism in the engine system in FIG. 1.

Referring to FIG. 5, a fuel supply mechanism of engine 10 described above will now be discussed. As shown in FIG. 5, this fuel supply mechanism includes a feed pump 1100 provided in fuel tank 200 and supplying fuel at a low discharge pressure (about 400 kPa corresponding to the pressure of a pressure regulator) (the same as low-pressure pump 180 in FIG. 1), a high-pressure fuel delivery apparatus 150 (a high-pressure fuel pump 1200) driven by a cam 1210, a high-pressure delivery pipe 1110 provided in order to supply high-pressure fuel to in-cylinder injector 110 (the same as fuel delivery pipe 130 in FIG. 1), in-cylinder injector 110 provided in high-pressure delivery pipe 1110 one for each cylinder, a low-pressure delivery pipe 1120 provided in order to supply fuel to intake manifold injector 120, and intake manifold injector 120 provided in low-pressure delivery pipe 1120 one for each intake manifold of each cylinder.

The discharge port of feed pump 1100 in fuel tank 200 is connected to a low-pressure supply pipe 1400, which is branched into a low-pressure delivery connection pipe 1410 and a pump supply pipe 1420. Low-pressure delivery connection pipe 1410 is connected to low-pressure delivery pipe 1120 provided with intake manifold injector 120.

Pump supply pipe 1420 is connected to an inlet port of high-pressure fuel pump 1200. A pulsation damper 1220 is provided immediately upstream of the inlet port of high-pressure fuel pumps 1200 so as to reduce fuel pulsation.

The discharge port of high-pressure fuel pump 1200 is connected to a high-pressure delivery connection pipe 1500, which is connected to high-pressure delivery pipe 1110. A relief valve 1140 provided in high-pressure delivery pipe 1110 is connected via a high-pressure delivery return pipe 1610 to a high-pressure fuel pump return pipe 1600. The return port of high-pressure fuel pump 1200 is connected to high-pressure fuel pump return pipe 1600. High-pressure fuel pump return pipe 1600 is connected to a return pipe 1630, and then connected to fuel tank 200.

Figure 6:
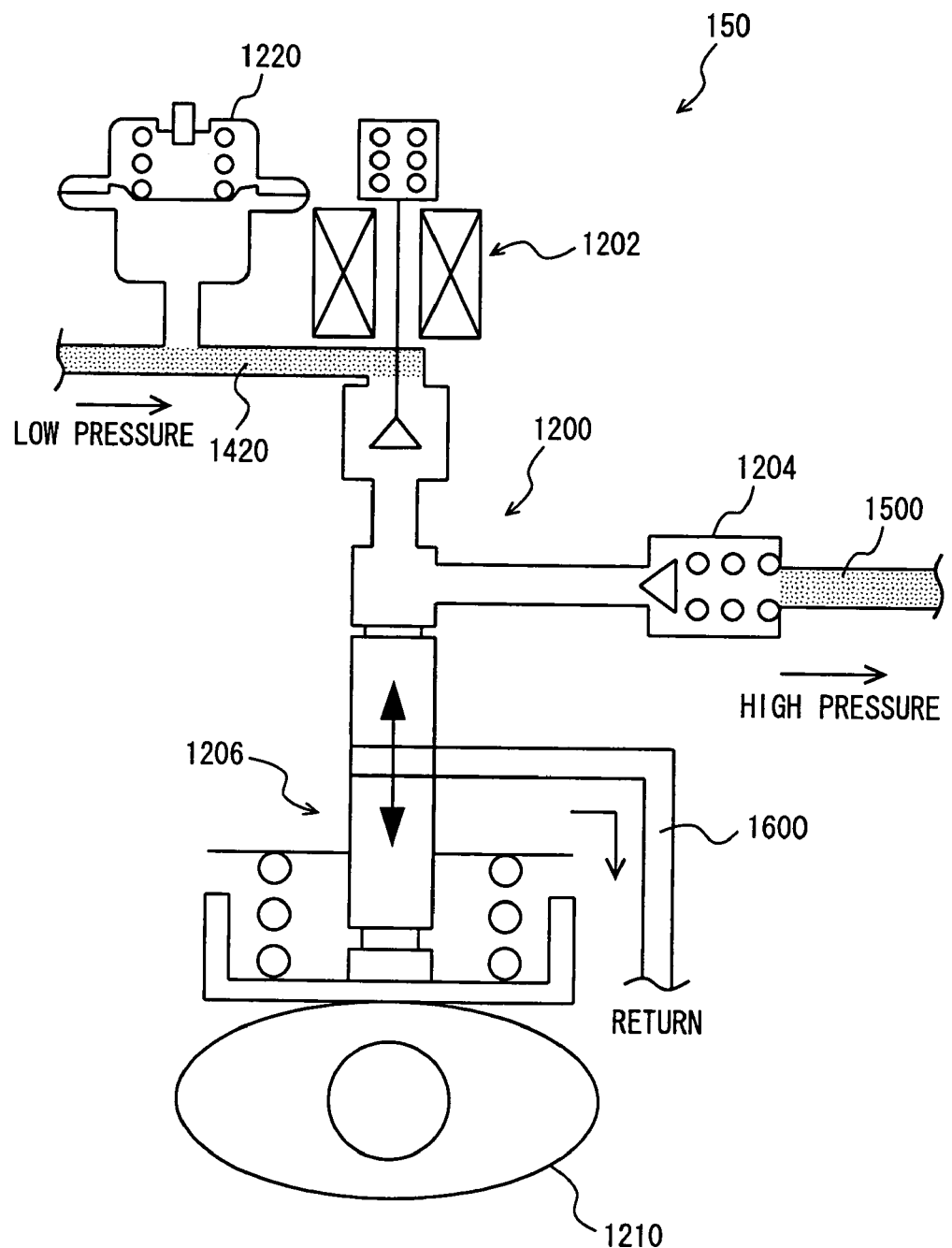
FIG. 6 is a partially enlarged view of FIG. 5.

FIG. 6 is an enlarged view of high-pressure fuel delivery apparatus 150 and its surroundings in FIG. 5. High-pressure fuel delivery apparatus 150 has, as its main components, high-pressure fuel pump 1200, a pump plunger 1206 driven by cam 1210 to slide up and down, an electromagnetic spill valve 1202, and a check valve 1204 provided with a leakage function.

When pump plunger 1206 is moved downward by cam 1210 and while electromagnetic spill valve 1202 is open, the fuel is introduced (suctioned). When pump plunger 1206 is moved upward by cam 1210, the timing to close electromagnetic spill valve 1202 is changed to control the amount of the fuel discharged from high-pressure fuel pump 1200. During the pressurizing stroke in which pump plunger 1206 is moved upward, the fuel of a greater amount is discharged as the timing to close electromagnetic spill valve 1202 is earlier, whereas the fuel of a smaller amount is discharged as the timing to close the valve is later. The drive duty of electromagnetic spill valve 1202 when the greatest amount of fuel is discharged is set to 100%, and the drive duty of electromagnetic spill valve 1202 when the smallest amount of fuel is discharged is set to 0%. When the drive duty of electromagnetic spill valve 1202 is 0%, electromagnetic spill valve 1202 remains open, in which case, although pump plunger 1206 slides up and down as long as cam 1210 continues to rotate (along with rotation of engine 10), the fuel is not pressurized because electromagnetic spill valve 1202 does not close.

The pressurized fuel presses and opens check valve 1204 provided with the leakage function (of the set pressure of about 60 kPa), and the fuel is delivered via high-pressure delivery connection pipe 1500 to high-pressure delivery pipe 1110. At this time, the fuel pressure is controlled in a feedback manner by fuel pressure sensor 400 provided in high-pressure delivery pipe 1110.

Figure 7:
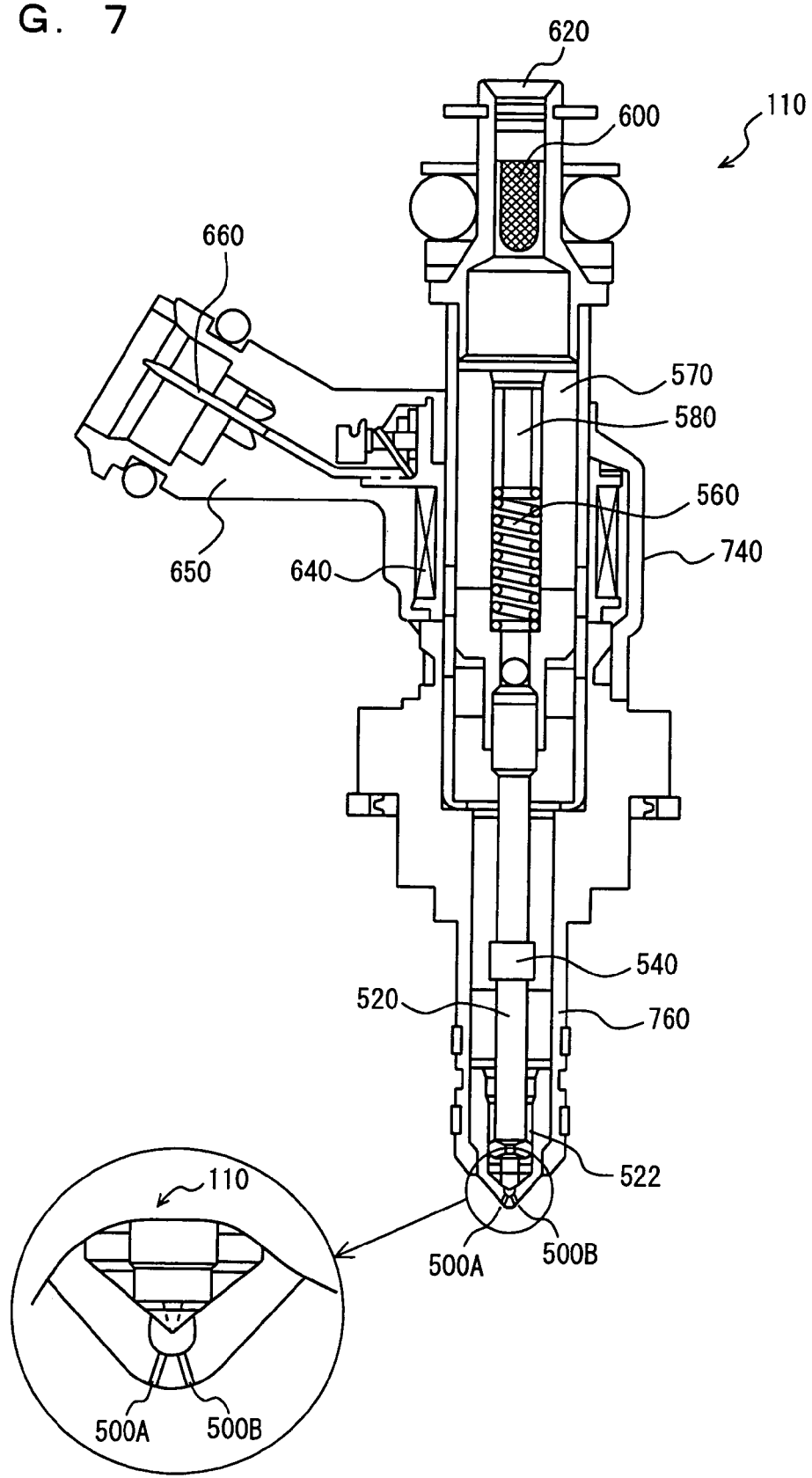
FIG. 7 is a cross-sectional view of an in-cylinder injector.

Referring to FIG. 7, in-cylinder injector 110 will be described. FIG. 7 is a longitudinal cross-sectional view of in-cylinder injector 110.

As shown in FIG. 7, in-cylinder injector 110 has a nozzle body 760 in a lower end of its main body 740, and nozzle body 760 is fixed by a nozzle holder with a spacer being interposed. Nozzle body 760 has an injection hole 500A and an injection hole 500B formed in its lower end, and a needle 520 is arranged in nozzle body 760 in a manner movable in the up-down direction. An upper end of needle 520 abuts on a core 540 which is slidable within main body 740. A spring 560 energizes needle 520 downward via core 540. Needle 520 is seated on an inner circumferential seat surface 522 of nozzle body 760, and consequently injection hole 500A and injection hole 500B are closed in a normal state.

A sleeve 570 is inserted in and fixed to the upper end of main body 740. A fuel passage 580 is formed in sleeve 570. Fuel passage 580 communicates, in its lower end, to the inside of nozzle body 760 through the passage in main body 740, so that the fuel is injected from injection hole 500A and injection hole 500B when needle 520 is lifted. The upper end of fuel passage 580 is connected to a fuel introduction port 620 through a filter 600, which is in turn connected to fuel delivery pipe 130 in FIG. 1.

An electromagnetic solenoid 640 is arranged so as to surround the lower end portion of sleeve 570 within main body 740. While a current is fed to solenoid 640, core 540 is lifted against spring 560, needle 520 is lifted as a result of a fuel pressure, and injection hole 500A and injection hole 500B are opened, whereby fuel injection is performed. Solenoid 640 is taken out to a wire 660 within an insulating housing 650, so that solenoid 640 can receive an electric signal for valve opening from engine ECU 300. If engine ECU 300 does not output the electric signal for valve opening, fuel injection from in-cylinder injector 110 is not performed.

Fuel injection timing and a fuel injection period of in-cylinder injector 110 are controlled by the electric signal for valve opening received from engine ECU 300. The fuel injection period is controlled so as to regulate an amount of fuel injection from in-cylinder injector 110. In other words, the electric signal may be used to control fuel injection also in order to achieve fuel injection of a small amount (in a region not smaller than a minimum fuel injection amount). It is noted that an EDU (Electronic Driver Unit) may be provided between engine ECU 300 and in-cylinder injector 110 for such control. It is noted that the pressure of fuel supplied to in-cylinder injector 110 structured as above is very high (approximately 13 MPa).

Figure 8:
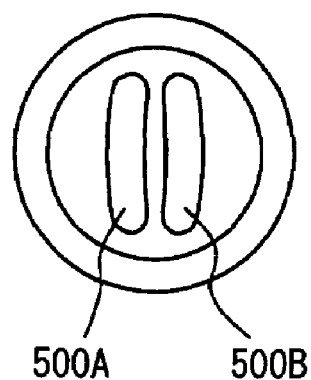
FIG. 8 is a cross-sectional view of an injection hole of the in-cylinder injector.
Figure 9:
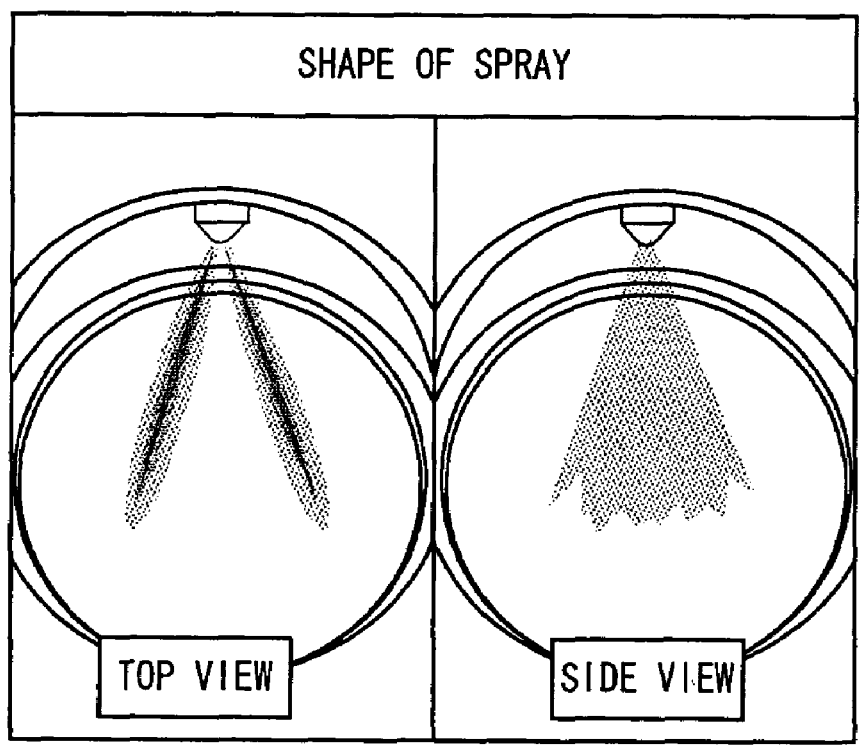
FIG. 9 illustrates a shape of spray from the in-cylinder injector.

FIG. 8 shows injection hole 500A and injection hole 500B viewed from the inside of in-cylinder injector 110. As shown in FIG. 8, injection holes in an oblong slit shape are formed in parallel to each other (oblong W slits). The fuel injected through injection hole 500A and injection hole 500B spreads in an inverted V-shape when viewed from above, as shown in FIG. 9, with spark plug 119 provided between two prongs. In addition, the fuel injected through injection hole 500A and injection hole 500B spreads in a shape of a fan opened in directions both up and down when viewed from the side, as shown in FIG. 9.

When viewed from above, spark plug 119 is provided between the two prongs. Therefore, restrained atomization resulting from impinging of the spray on spark plug 119 can be avoided. Meanwhile, when viewed from the side, the spray is in a shape of a fan opened in both up and down directions, and a recess formed by a gently curved contour is provided in the top portion of piston 123. When the piston has a flat top surface, the fuel injected from in-cylinder injector 110 adheres to that flat surface and atomization is prevented. Such restrained atomization, however, is avoided by means of the recess.

It is noted that the shape of the spray may be:

1) in a fan shape containing spark plug 119 when viewed from above (when viewed two-dimensionally) and in a fan shape when viewed from the side;

2) in a fan shape containing spark plug 119 when viewed from above and in a fan shape of only upper half when viewed from the side;

3) in a fan shape containing spark plug 119 when viewed from above and in a fan shape of only lower half when viewed from the side; or 4) in a fan shape containing spark plug 119 when viewed from the side.

As shown in the top view of FIG. 9, the spray is injected in an inverted V-shape with spark plug 119 lying between two spray prongs. Here, an amount of suctioned air or an amount of fuel injection is controlled in accordance with output (load) requested in engine 10.

When an amount of suctioned air regulated by a position of throttle valve 70 or an amount of suctioned air regulated by a lift amount of intake valve 122 is varied, the pressure in the cylinder is varied. Specifically, when the amount of suctioned air is large, the negative pressure in the cylinder is small (specifically, even when the pressure is negative, the pressure is rather closer to atmospheric pressure, using the atmospheric pressure as the reference; though the sign is minus, the absolute value of the pressure is small). When the amount of suctioned air is small, the negative pressure in the cylinder is large (specifically, when the pressure is negative, the pressure is not close to atmospheric pressure, using the atmospheric pressure as the reference; the sign is minus, and the absolute value of the pressure is large). For example, difference in the pressure in the cylinder is such that the pressure in the cylinder is set to approximately −3 kPa at the time of WOT, while it is set to approximately −70 kPa during idle.

When the amount of suctioned air is small, the amount of fuel injection from in-cylinder injector 110 is normally also small. When the amount of suctioned air is large, the amount of fuel injection from in-cylinder injector 110 is normally also large.

As described above, in the high output region (high load region), the amount of suctioned air is large, the pressure in the cylinder is set to a negative pressure not so great, and the amount of fuel injection is also large. In such a region, the fuel is injected with large traveling force such that two spray prongs do not overlap with each other. Accordingly, homogeneity of the fuel in the cylinder is enhanced and homogenous combustion is realized. On the other hand, in the low output region (low load region), the amount of suctioned air is small, the pressure in the cylinder is set to a large negative pressure, and the amount of fuel injection is also small. In such a region, the fuel is injected with weak traveling force such that two spray prongs overlap with each other. Accordingly, the spray is pulled by the negative pressure and the spray in a thin slit shape spreads against the traveling force. Here, the spread two spray prongs overlap with each other around the center. As spark plug 119 is arranged in such an overlapping portion, the two spray prongs overlap with each other in the vicinity of spark plug 119 and a rich air-fuel mixture can be formed in the vicinity of spark plug 119. In this manner, stratified charge combustion or semi-stratified charge combustion (hereinafter, referred to as semi-stratified charge combustion) is realized, in which concentration distribution of the fuel in the cylinder is such that richer state is attained in the vicinity of spark plug 119 while leaner state is attained around the same.

In order to achieve homogenous combustion and semi-stratified charge combustion by utilizing the difference in the output (load), an approach to change a fuel injection ratio (DI ratio r) between in-cylinder injector 110 and intake manifold injector 120 is also considered. In the present invention, for adaption to engine 10 provided solely with in-cylinder injector 110, not with intake manifold injector 120, such different combustion manners are realized by such control that the pressure of the fuel supplied to in-cylinder injector 110 is varied so as to modify the traveling force. Such control as characterizing the present invention will now be described.

Figure 10:
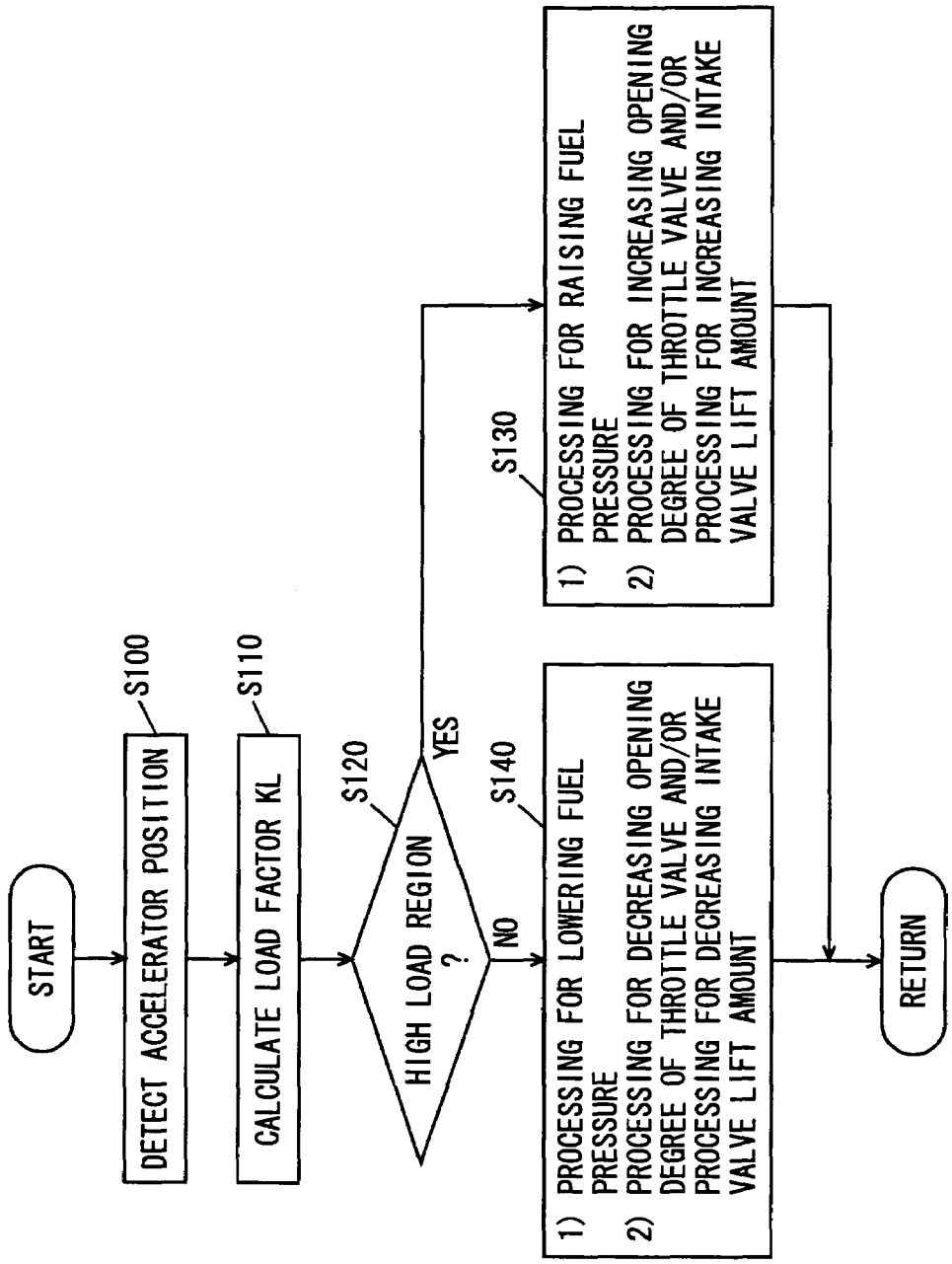
FIG. 10 is a flowchart showing a control configuration of a program executed in an engine ECU in FIG. 1.

A control configuration of a program executed in engine ECU 300 controlling engine 10 according to the present embodiment will be described with reference to FIG. 10.

At step (hereinafter, step is abbreviated as S) 100, engine ECU 300 detects an accelerator position. Here, engine ECU 300 detects the accelerator position based on a signal input from accelerator position sensor 440 provided in accelerator pedal 100.

At S110, engine ECU 300 calculates a load factor KL required in engine 10. Here, engine ECU 300 can calculate increment in the load factor as a result of an acceleration request or the like from the driver, based on change in the detected accelerator position. Alternatively, load factor KL may be calculated in correspondence with an engine 10 output request made by an operation control system of the vehicle.

At S120, engine ECU 300 determines whether or not calculated load factor KL indicates the predetermined high load region. If calculated load factor KL indicates the predetermined high load region (YES at S120), the process proceeds to S130. Otherwise (NO at S120), the process proceeds to S140.

At S130, engine ECU 300 performs processing for raising the fuel pressure (maintaining the fuel pressure if the engine is already in the high load region and the fuel pressure is sufficiently high). Here, engine ECU 300 outputs a signal for controlling drive duty of electromagnetic spill valve 1202 (increasing drive duty toward 100%). The fuel pressure at this time is set to approximately 12 to 13 MPa. In addition to such fuel pressure control, engine ECU 300 performs the processing for increasing the degree of opening of throttle valve 70 and/or processing for increasing the lift amount of intake valve 122. Here, engine ECU 300 outputs a control signal for increasing the valve lift amount to the variable valve lift amount mechanism, so that a distance of the up-down movement of intake valve 122 is made larger. As a result of control of throttle valve 70 or intake valve 122, the amount of suctioned air is increased. Consequently, the negative pressure in the cylinder is raised to approximately −3 kPa (the negative pressure in the cylinder is raised toward the atmospheric pressure).

At S140, engine ECU 300 performs processing for lowering the fuel pressure (maintaining the fuel pressure if the engine is already in the low load region and the fuel pressure is sufficiently low). Here, engine ECU 300 outputs a signal for controlling drive duty of electromagnetic spill valve 1202 (decreasing drive duty toward 0%). The fuel pressure at this time is set to approximately 4 MPa, however, the fuel pressure is not limited as such (4 MPa). In addition to such fuel pressure control, engine ECU 300 performs the processing for decreasing the degree of opening of throttle valve 70 and/or processing for decreasing the lift amount of intake valve 122. Here, engine ECU 300 outputs a control signal for decreasing the valve lift amount to the variable valve lift amount mechanism, so that a distance of the up-down movement of intake valve 122 is made smaller. As a result of control of throttle valve 70 or intake valve 122, the amount of suctioned air is decreased. Consequently, the negative pressure in the cylinder is lowered to approximately −70 kPa (the negative pressure in the cylinder is lowered relative to the atmospheric pressure).

An operation of engine 10 according to the present embodiment based on the configuration and the flowchart above will now be described.

[Change from Low Load to High Load]

During idle of engine 10, the detected degree of opening of the accelerator is small, and calculated load factor KL is small (S100, S110). In this state, engine 10 is operated in the low load region.

When the driver presses (down) the accelerator in such a state, greater degree of opening of the accelerator is detected and calculated load factor KL is large (S100, S110). Thereafter, engine 10 is determined as operating in the high load region (YES at S120), and the duty control signal to electromagnetic spill valve 1202 is raised such that the pressure of the fuel (fuel pressure) supplied to in-cylinder injector 110 is raised, for example, from approximately 4 MPa to 12 to 13 MPa. In addition, adjustment to increase the degree of opening of throttle 70 or/and the lift amount of intake valve 122 is made, so as to increase the amount of suctioned air. Here, the amount of fuel injection from in-cylinder injector 1110 is also increased, and the output of engine 10 is raised.

Figure 11:
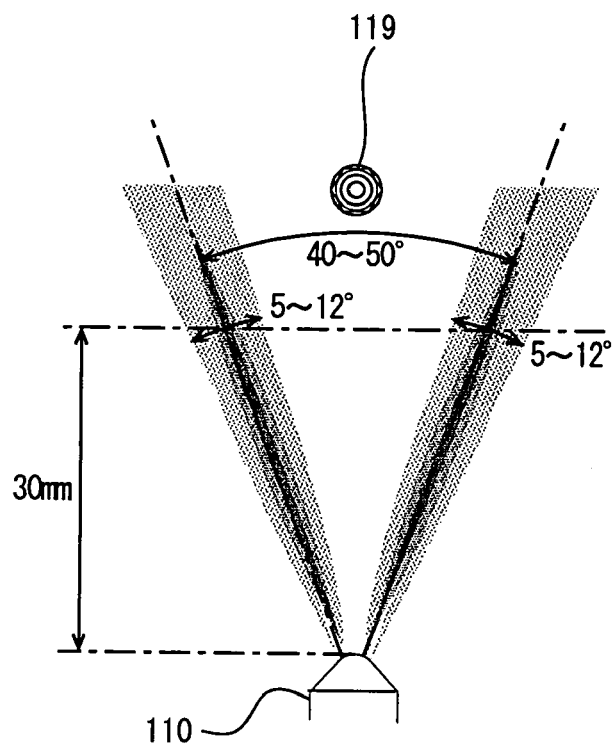
FIGS. 11 to 13 show other shapes of spray from the in-cylinder injector.

FIG. 11 shows the state in the cylinder at this time. FIG. 11 shows a top view of the cylinder, in which the spray formed by the fuel injected from in-cylinder injector 110 maintains a slit-like shape by the strong traveling force resulted from the large fuel pressure and the weak negative pressure. Here, as shown in FIG. 11, an angle of spread between the two prongs of the spray in the V-shape is preferably set to approximately 40° to approximately 50°. In addition, spread of the spray (spread of any one of the two prongs of the spray in the V-shape, when the cylinder is viewed from above) is preferably set to approximately 5° to approximately 12° at a position distant from the end of in-cylinder injector 110 by 30 mm. Though not shown, spread of the spray (spread of any one of the two prongs of the spray in the V-shape, when the cylinder is viewed from the side) is set to approximately 29.5° to approximately 37.50 at a position distant from the end of in-cylinder injector 110 by approximately 40 mm. With the slit achieving such an angle, homogeneity of the fuel in the cylinder can be enhanced most and satisfactory homogenous combustion can be realized.

[Change from High Load to Low Load]

During the high load operation of engine 10 (for example, acceleration for passing), the detected degree of opening of the accelerator is great and calculated load factor KL is large (S100, S110). In this state, engine 10 is operated in the high load region.

When the driver stops pressing the accelerator in such a state, smaller degree of opening of the accelerator is detected and calculated load factor KL is small (S100, S110). Engine 10 is determined as operating in the low load region (NO at S120), and the duty control signal to electromagnetic spill valve 1202 is lowered such that the pressure of the fuel (fuel pressure) supplied to in-cylinder injector 110 is lowered, for example, from 12 to 13 MPa to approximately 4 MPa. In addition, adjustment to decrease the degree of opening of throttle 70 or/and the lift amount of intake valve 122 is made, so as to decrease the amount of suctioned air. Here, the amount of fuel injection from in-cylinder injector 110 is also decreased, and the output of engine 10 is lowered.

Figure 12:
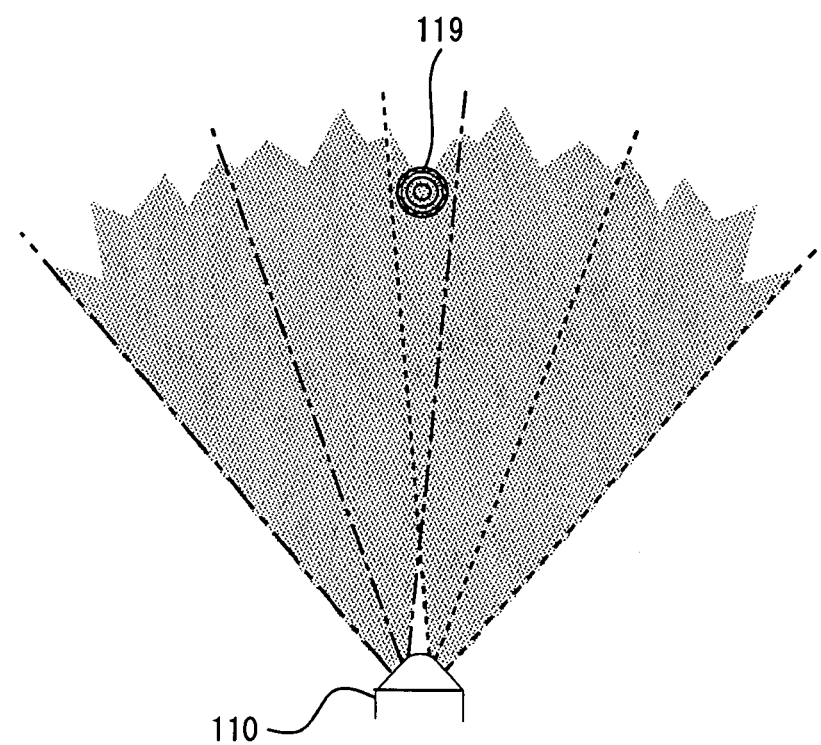

FIG. 12 shows the state in the cylinder at this time. Similarly to FIG. 11, FIG. 12 also shows a top view of the cylinder, in which the spray formed by the fuel injected from in-cylinder injector 110 no longer maintains a slit-like shape due to the weak traveling force resulted from the small fuel pressure and the great negative pressure. The fuel can no longer maintain the thin slit-like shape due to the negative pressure and the fuel is considerably diffused due to the weak traveling force and the great negative pressure. Namely, the two spray prongs injected through the slits serving as injection holes of in-cylinder injector 110 overlap with each other in the vicinity of spark plug 119, as a result of increased thickness of the spray which is attributable to the great negative pressure in the cylinder (two spray prongs intersect with each other). As shown in FIG. 12, the spray from one injection hole shown with a chain-dotted line and the spray from another injection hole shown with a dotted line overlap in the vicinity of spark plug 119. In such a case, concentration of the fuel in the vicinity of spark plug 119 can be high (rich), and concentration of the fuel around the same can be low (lean). Therefore, ignitionability is improved, satisfactory semi-stratified charge combustion can be realized, and fuel efficiency can be improved.

Figure 13:
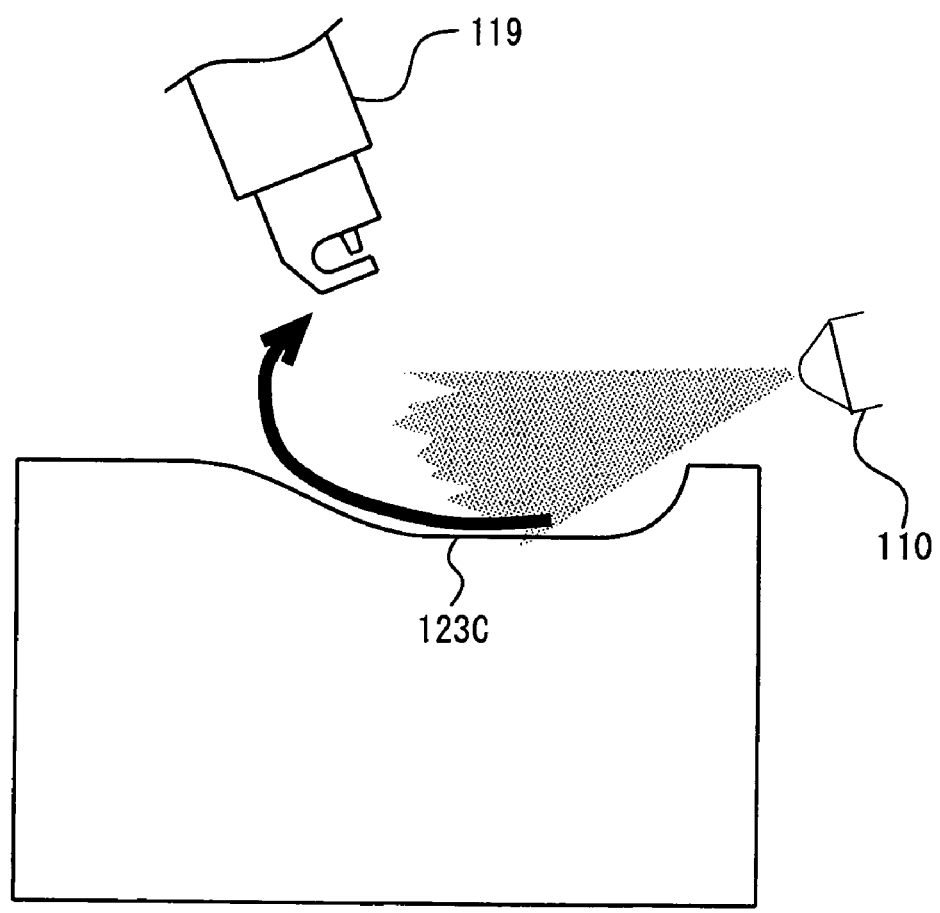

In the low load region, the fuel is diffused due to the weak traveling force and the great negative pressure described above. As shown in FIG. 13, however, when the cylinder is viewed from the side, the fuel can be concentrated in the vicinity of spark plug 119 by means of an air current introduced into the cylinder (arrow shown in FIG. 13) and cavity 123C provided in the top surface of the cylinder. In this manner, in the low load region, two spray prongs overlap with each other in the vicinity of spark plug 119 as seen in the top view of the cylinder, and the spray is guided to the area in the vicinity of spark plug 119 by the air current and cavity 123C as seen in the side view of the cylinder, so that the air-fuel ratio in the vicinity of spark plug 119 can be rich, while the air-fuel ratio in the area around the same can be lean.

As described above, according to the engine system of the present embodiment, homogenous combustion and semi-stratified charge combustion can be realized with the in-cylinder injector having a slit for forming the spray in an inverted V-shape when the cylinder is viewed from above and in a fan shape when the cylinder is viewed from the side. Namely, in the high output region (high load region), the fuel is injected from the in-cylinder injector at a high fuel pressure such that the spray prongs injected through the slits do not intersect with each other and diffusion of the spray is enhanced. Homogeneity of the fuel in the cylinder can thus be enhanced and satisfactory homogenous combustion can be realized. On the other hand, in the low output region (low load region), the fuel is injected from the in-cylinder injector at a low fuel pressure, such that a thickness of the spray from each slit is made larger by the negative pressure in the cylinder and the spray prongs are caused to overlap in the vicinity of the spark plug (spray prongs intersect with each other). The rich state is thus attained in the vicinity of the spark plug, while an area around the same attains the lean state. Accordingly, stratification of the fuel in the cylinder is enhanced, satisfactory semi-stratified charge combustion can be realized, and fuel efficiency can be improved.

<Engine (1) to which Present Control Device is Suitably Adapted>

An engine (1) to which the control device of the present embodiment is suitably adapted will now be described.

Figure 14:
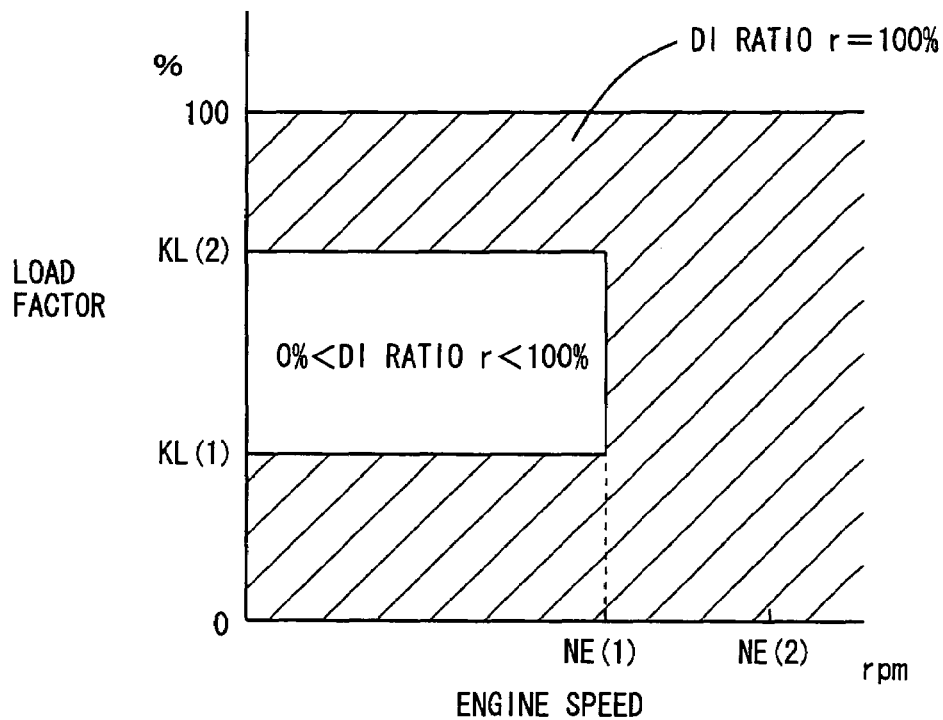
FIGS. 14 and 15 illustrate a first example of DI ratio maps in a warm state and a cold state respectively, of an engine to which the control device according to the embodiment of the present invention is suitably adapted.
Figure 15:
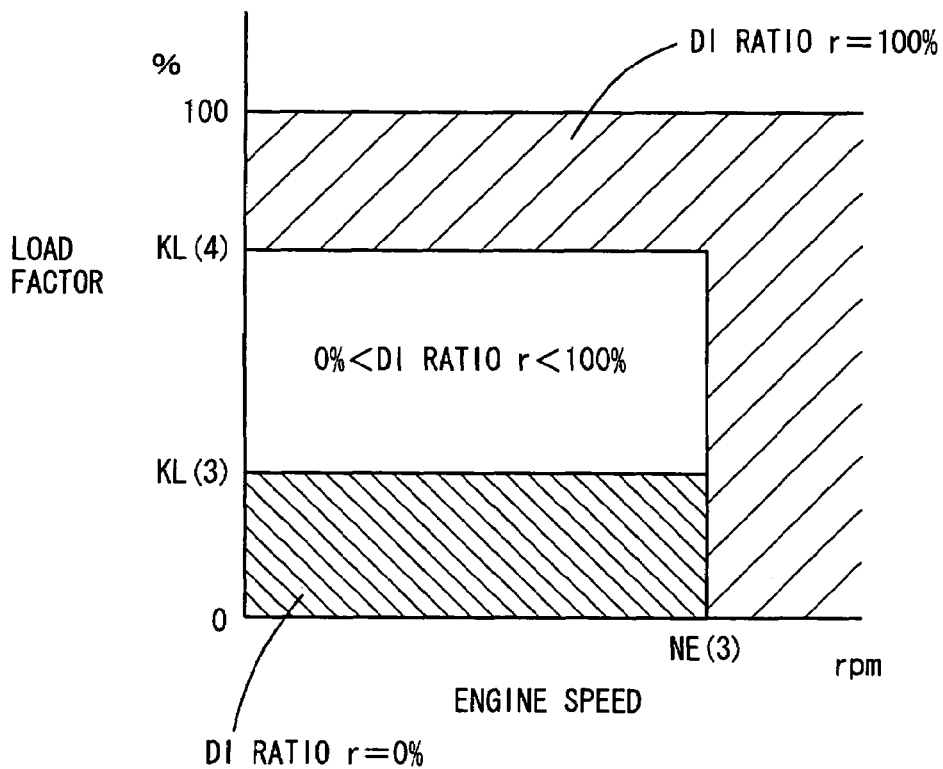

Referring to FIGS. 14 and 15, maps each indicating a fuel injection ratio between in-cylinder injector 110 and intake manifold injector 120 (hereinafter, also referred to as a DI ratio (r)), identified as information associated with an operation state of engine 10, will now be described. The maps are stored in ROM 320 of engine ECU 300. FIG. 14 is the map for a warm state of engine 10, and FIG. 15 is the map for a cold state of engine 10.

In the maps illustrated in FIGS. 14 and 15, with the horizontal axis representing an engine speed of engine 10 and the vertical axis representing a load factor, the fuel injection ratio of in-cylinder injector 110, or the DI ratio r, is expressed in percentage.

As shown in FIGS. 14 and 15, the DI ratio r is set for each operation region that is determined by the engine speed and the load factor of engine 10. "DI RATIO r=100%" represents the region where fuel injection is carried out using only in-cylinder injector 110, and "DI RATIO r=0%" represents the region where fuel injection is carried out using only intake manifold injector 120. "DI RATIO r≠0%", "DI RATIO r≠100%" and "0%<DI RATIO r<100%" each represent the region where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of engine 10, so that only homogeneous combustion is conducted in the normal operation state of engine 10 (other than the abnormal operation state such as a catalyst warm-up state during idling).

Further, as shown in FIGS. 14 and 15, the fuel injection ratio between in-cylinder injector 110 and intake manifold injector 120, or the DI ratio r, is defined individually in the map for the warm state and in the map for the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 14 is selected; otherwise, the map for the cold state shown in FIG. 15 is selected. One or both of in-cylinder injector 110 and intake manifold injector 120 are controlled based on the selected map and according to the engine speed and the load factor of engine 10.

The engine speed and the load factor of engine 10 set in FIGS. 14 and 15 will now be described. In FIG. 14, NE(1) is set to 2500 rpm to 2700 rpm, KL(1) is set to 30% to 50%, and KL(2) is set to 60% to 90%. In FIG. 15, NE(3) is set to 2900 rpm to 3100 rpm. That is, NE(1)<NE(3). NE(2) in FIG. 14 as well as KL(3) and KL(4) in FIG. 15 are also set as appropriate.

When comparing FIG. 14 and FIG. 15, NE(3) of the map for the cold state shown in FIG. 15 is greater than NE(1) of the map for the warm state shown in FIG. 14. This shows that, as the temperature of engine 10 is lower, the control region of intake manifold injector 120 is expanded to include the region of higher engine speed. That is, in the case where engine 10 is cold, deposits are unlikely to accumulate in the injection hole of in-cylinder injector 110 (even if the fuel is not injected from in-cylinder injector 110). Thus, the region where the fuel injection is to be carried out using intake manifold injector 120 can be expanded, to thereby improve homogeneity.

When comparing FIG. 14 and FIG. 15, "DI RATIO r=100%" in the region where the engine speed of engine 10 is NE(1) or higher in the map for the warm state, and in the region where the engine speed is NE(3) or higher in the map for the cold state. In terms of load factor, "DI RATIO r=100%" in the region where the load factor is KL(2) or greater in the map for the warm state, and in the region where the load factor is KL(4) or greater in the map for the cold state. This means that in-cylinder injector 110 solely is used in the region of a predetermined high engine speed, and in the region of a predetermined high engine load. That is, in the high speed region or the high load region, even if fuel injection is carried out using only in-cylinder injector 110, the engine speed and the load of engine 10 are high, ensuring a sufficient intake air quantity, so that it is readily possible to obtain a homogeneous air-fuel mixture even using only in-cylinder injector 110. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, whereby antiknock performance is improved. Further, since the temperature within the combustion chamber is decreased, intake efficiency improves, leading to high power output.

In the map for the warm state in FIG. 14, fuel injection is carried out using only in-cylinder injector 110 when the load factor is KL(1) or less. This shows that in-cylinder injector 110 alone is used in a predetermined low load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring the minimum fuel injection quantity thereof. Thus, in-cylinder injector 110 alone is used in the relevant region.

When comparing FIG. 14 and FIG. 15, there is a region of "DI RATIO r=0%" only in the map for the cold state in FIG. 15. This shows that fuel injection is carried out using only intake manifold injector 120 in a predetermined low load region (KL(3) or less) when the temperature of engine 10 is low. When engine 10 is cold and low in load and the intake air quantity is small, atomization of the fuel is unlikely to occur. In such a region, it is difficult to ensure favorable combustion with the fuel injection from in-cylinder injector 110. Further, particularly in the low-load and low-speed region, high output using in-cylinder injector 110 is unnecessary. Accordingly, fuel injection is carried out using only intake manifold injector 120, rather than in-cylinder injector 110, in the relevant region.

Further, in an operation other than the normal operation, or in the catalyst warm-up state during idling of engine 10 (abnormal operation state), in-cylinder injector 110 is controlled to carry out stratified charge combustion. By causing the stratified charge combustion only during the catalyst warm-up operation, warming up of the catalyst is promoted, and exhaust emission is thus improved.

<Engine (2) to which Present Control Device is Suitably Adapted>

Hereinafter, an engine (2) to which the control device of the present embodiment is suitably adapted will be described. In the following description of the engine (2), the configurations similar to those of the engine (1) will not be repeated.

Figure 16:
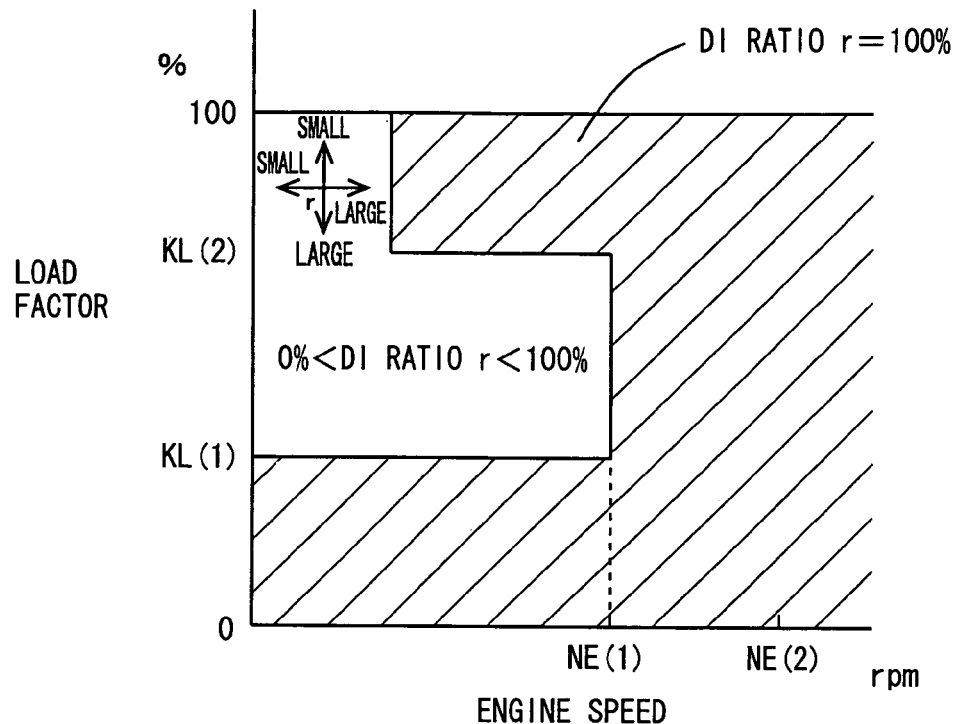
FIGS. 16 and 17 illustrate a second example of DI ratio maps in a warm state and a cold state respectively, of an engine to which the control device according to the embodiment of the present invention is suitably adapted.
Figure 17:
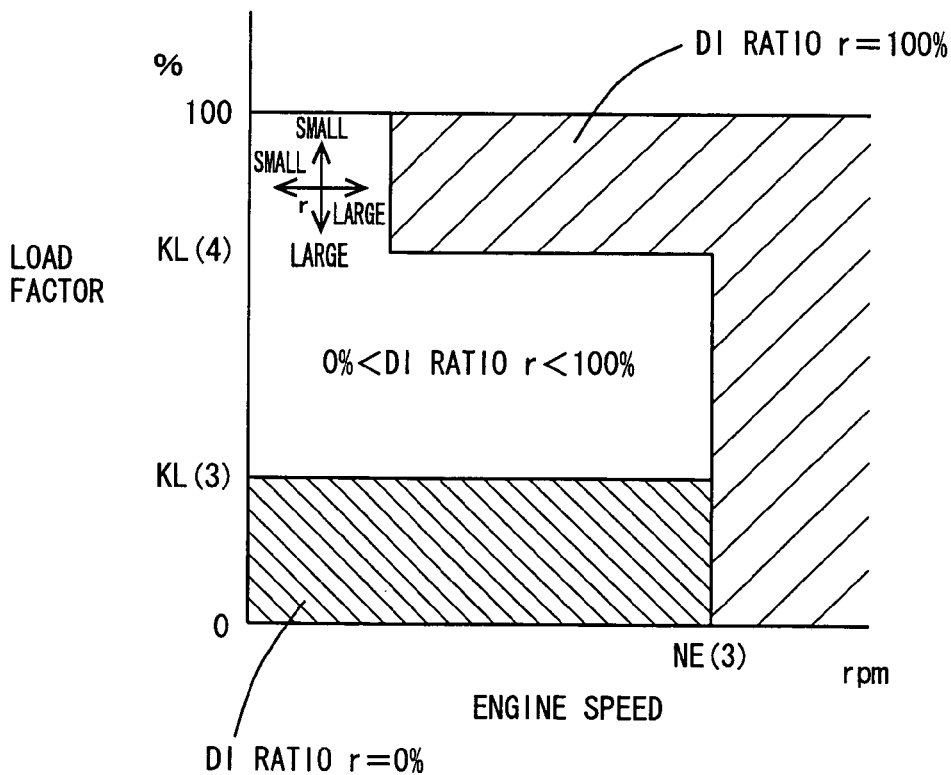

Referring to FIGS. 16 and 17, maps each indicating the fuel injection ratio between in-cylinder injector 110 and intake manifold injector 120, identified as information associated with the operation state of engine 10, will be described. The maps are stored in ROM 320 of engine ECU 300. FIG. 16 is the map for the warm state of engine 10, and FIG. 17 is the map for the cold state of engine 10.

FIGS. 16 and 17 differ from FIGS. 14 and 15 in the following points. "DI RATIO r=100%" holds in the region where the engine speed of engine 10 is equal to or higher than NE(1) in the map for the warm state, and in the region where engine 10 speed is NE(3) or higher in the map for the cold state. Further, except for the low-speed region, "DI RATIO r=100%" holds in the region where the load factor is KL(2) or greater in the map for the warm state, and in the region where the load factor is KL(4) or greater in the map for the cold state. This means that fuel injection is carried out using only in-cylinder injector 110 in the region where the engine speed is at a predetermined high level, and that fuel injection is often carried out using only in-cylinder injector 110 in the region where the engine load is at a predetermined high level. However, in the low-speed and high-load region, mixing of an air-fuel mixture formed by the fuel injected from in-cylinder injector 110 is poor, and such inhomogeneous air-fuel mixture within the combustion chamber may lead to unstable combustion. Thus, the fuel injection ratio of the in-cylinder injector is increased as the engine speed increases where such a problem is unlikely to occur, whereas the fuel injection ratio of in-cylinder injector 110 is decreased as the engine load increases where such a problem is likely to occur. These changes in the DI ratio r are shown by crisscross arrows in FIGS. 16 and 17. In this manner, variation in output torque of the engine attributable to the unstable combustion can be suppressed. It is noted that these measures are approximately equivalent to the measures to decrease the fuel injection ratio of in-cylinder injector 110 as the state of engine 10 moves toward the predetermined low speed region, or to increase the fuel injection ratio of in-cylinder injector 110 as engine 10 state moves toward the predetermined low load region. Further, except for the relevant region (indicated by the crisscross arrows in FIGS. 16 and 17), in the region where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression end, and thus, the antiknock performance improves. Further, with the temperature of the combustion chamber decreased, intake efficiency improves, leading to high power output.

In engine 10 explained in conjunction with FIGS. 14-17, homogeneous combustion is achieved by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be located locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to provide a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idle state) so as to cause a high-temperature combustion gas to reach the catalyst. Further, a certain quantity of fuel needs to be supplied. If the stratified charge combustion is employed to satisfy these requirements, the quantity of the fuel will be insufficient. If the homogeneous combustion is employed, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine explained in conjunction with FIGS. 14-17, the fuel injection timing of in-cylinder injector 110 is preferably set in the intake stroke in a basic region corresponding to the almost entire region (here, the basic region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the sprayed fuel, so that the combustion rate increases. The improvement in antiknock performance and the increase in combustion rate can prevent variation in combustion, and thus, combustion stability is improved.

Regardless of the temperature of engine 10 (that is, whether engine 10 is in the warm state or in the cold state), the warm state map shown in FIG. 14 or 16 may be used during idle-off state (when an idle switch is off, or when the accelerator pedal is pressed) (regardless of whether engine 10 is in the cold state or in the warm state, in the low load region, in-cylinder injector 110 is used).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for an internal combustion engine provided with a fuel injection mechanism for injecting a fuel into a cylinder, said internal combustion engine including an intake manifold formed on one side of a cylinder head when a cylinder, in which an axial center of a cylinder bore is aligned with a vertical line, is viewed from a side, an exhaust manifold formed on a side opposite to said intake manifold, a piston making up-down movement through said cylinder bore, and a spark plug of which discharge portion is exposed in said cylinder bore, the fuel injected from said fuel injection mechanism forming a spray in an inverted V-shape with said discharge portion lying between two prongs of the spray when said cylinder is viewed two-dimensionally, comprising:
   a detection unit for detecting a load state of said internal combustion engine;
   a fuel pressure control unit for varying a pressure of the fuel supplied to said fuel injection mechanism based on said load state; and
   an air amount control unit for varying an amount of air suctioned into said cylinder based on said load state, wherein
   said fuel pressure control unit controls said pressure of the fuel such that it is raised so that the two prongs of the spray in an inverted V-shape do not intersect with each other when load is high, and controls said pressure of the fuel such that it is lowered so that the two prongs of the spray in an inverted V-shape are caused to overlap in vicinity of the spark plug when load is low, and
   said air amount control unit controls said amount of the air such that it is increased when load is high, and controls said amount of the air such that it is decreased when load is low.

2. The control device for an internal combustion engine according to claim 1, wherein
   said air amount control unit varies said amount of the air by adjusting a position of a throttle valve provided in said intake manifold.

3. The control device for an internal combustion engine according to claim 1, wherein
   said internal combustion engine is provided with a variable lift amount control mechanism for varying a lift amount of an intake valve, and
   said air amount control unit varies said amount of the air by controlling said variable lift amount control mechanism to adjust said lift amount.

4. The control device for an internal combustion engine according to claim 1, wherein
   when said cylinder is viewed two-dimensionally, an angle of spread between the two prongs of the spray in the inverted V-shape is set to approximately 40° to approximately 50°.

5. The control device for an internal combustion engine according to claim 1, wherein
   when said cylinder is viewed two-dimensionally, one of the two prongs of the spray in the inverted V-shape has a thickness of approximately 5° to approximately 12° at a position distant from an injection hole of said fuel injection mechanism by approximately 30 mm.

6. The control device for an internal combustion engine according to claim 1, wherein
   when said cylinder is viewed from the side, one of the two prongs of the spray in the inverted V-shape has a thickness of approximately 29.5° to approximately 37.5° at a position distant from an injection hole of said fuel injection mechanism by approximately 40 mm.

7. The control device for an internal combustion engine according to claim 1, wherein
   said internal combustion engine further includes a fuel injection mechanism injecting a fuel into an intake manifold.

8. The control device for an internal combustion engine according to claim 7, wherein
   said fuel injection mechanism injecting the fuel into said cylinder is an in-cylinder injector, and
   said fuel injection mechanism injecting the fuel into said intake manifold is an intake manifold injector.

9. A control device for an internal combustion engine provided with fuel injection means for injecting a fuel into a cylinder, said internal combustion engine including an intake manifold formed on one side of a cylinder head when a cylinder, in which an axial center of a cylinder bore is aligned with a vertical line, is viewed from a side, an exhaust manifold formed on a side opposite to said intake manifold, a piston making up-down movement through said cylinder bore, and a spark plug of which discharge portion is exposed in said cylinder bore, the fuel injected from said fuel injection means forming a spray in an inverted V-shape with said discharge portion lying between two prongs of the spray when said cylinder is viewed two-dimensionally, comprising:
   detection means for detecting a load state of said internal combustion engine;
   fuel pressure control means for varying a pressure of the fuel supplied to said fuel injection means based on said load state; and
   air amount control means for varying an amount of air suctioned into said cylinder based on said load state, wherein
   said fuel pressure control means controls said pressure of the fuel such that it is raised so that the two prongs of the spray in an inverted V-shape do not intersect with each other when load is high, and controls said pressure of the fuel such that it is lowered so that the two prongs of the spray in an inverted V-shape are caused to overlap in vicinity of the spark plug when load is low, and said air amount control means controls said amount of the air such that it is increased when load is high, and controls said amount of the air such that it is decreased when load is low.

10. The control device for an internal combustion engine according to claim 9, wherein said air amount control means includes means for varying said amount of the air by adjusting a position of a throttle valve provided in said intake manifold.

11. The control device for an internal combustion engine according to claim 9, wherein said internal combustion engine is provided with a variable lift amount control mechanism for varying a lift amount of an intake valve, and said air amount control means includes means for varying said amount of the air by controlling said variable lift amount control mechanism to adjust said lift amount.

12. The control device for an internal combustion engine according to claim 9, wherein when said cylinder is viewed two-dimensionally, an angle of spread between the two prongs of the spray in the inverted V-shape is set to approximately 40° to approximately 50°.

13. The control device for an internal combustion engine according to claim 9, wherein when said cylinder is viewed two-dimensionally, one of the two prongs of the spray in the inverted V-shape has a thickness of approximately 5° to approximately 12° at a position distant from an injection hole of said fuel injection means by approximately 30 mm.

14. The control device for an internal combustion engine according to claim 9, wherein when said cylinder is viewed from the side, one of the two prongs of the spray in the inverted V-shape has a thickness of approximately 29.5° to approximately 37.5° at a position distant from an injection hole of said fuel injection means by approximately 40 mm.

15. The control device for an internal combustion engine according to claim 9, wherein said internal combustion engine further includes fuel injection means for injecting a fuel into an intake manifold.

16. The control device for an internal combustion engine according to claim 15, wherein said fuel injection means for injecting the fuel into said cylinder is an in-cylinder injector, and said fuel injection means for injecting the fuel into said intake manifold is an intake manifold injector.

* * * * *